United States Patent
Dutta et al.

(10) Patent No.: US 9,069,788 B2
(45) Date of Patent: Jun. 30, 2015

(54) TRUNCATING DATA ASSOCIATED WITH OBJECTS IN A MULTI-TENANT DATABASE

(75) Inventors: Arup Dutta, San Ramon, CA (US); Simon Wong, San Carlos, CA (US); Dan Soble, Pleasanton, CA (US); Nathanael Black, San Francisco, CA (US); Walter Macklem, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 815 days.

(21) Appl. No.: 13/287,022

(22) Filed: Nov. 1, 2011

(65) Prior Publication Data
US 2013/0007062 A1 Jan. 3, 2013

Related U.S. Application Data

(60) Provisional application No. 61/503,750, filed on Jul. 1, 2011.

(51) Int. Cl.
*G06F 17/30* (2006.01)

(52) U.S. Cl.
CPC ................................ *G06F 17/30165* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,860,136 A * | 1/1999 | Fenner | 711/201 |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |

(Continued)

*Primary Examiner* — Wilson Lee
(74) *Attorney, Agent, or Firm* — Ingrassia Fisher & Lorenz, P.C.

(57) ABSTRACT

An embodiment of a multi-tenant database system includes a multi-tenant database, an entity definition table, and a data processing engine. The database has objects for multiple tenants, including an existing object for a designated tenant. Each entry in the existing object has a respective entity identifier. The definition table has entries for the database objects, including a metadata entry for the existing object. This metadata entry has a tenant identifier for the designated tenant, an entity name for the existing object, and an old key prefix for the existing object. Each entity identifier of the existing object begins with the old key prefix. The engine performs a data truncation operation on the existing object by updating the metadata entry to replace the old key prefix with a new key prefix. This results in an updated object that is identified by the new key prefix and the tenant identifier.

20 Claims, 8 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,529,728 B2 | 5/2009 | Weissman et al. |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,635,250 B2 * | 1/2014 | Mehra .......................... 707/802 |
| 2001/0044791 A1 | 11/2001 | Richter et al. |
| 2002/0001307 A1 * | 1/2002 | Nguyen et al. ................ 370/386 |
| 2002/0072951 A1 | 6/2002 | Lee et al. |
| 2002/0082892 A1 | 6/2002 | Raffel |
| 2002/0083033 A1 * | 6/2002 | Abdo et al. ....................... 707/1 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0091589 A1 * | 4/2005 | Ramarao ....................... 715/522 |
| 2006/0053414 A1 * | 3/2006 | Bhandari et al. .............. 717/133 |
| 2007/0113172 A1 * | 5/2007 | Behrens et al. ............... 715/513 |

\* cited by examiner

| ENTITY DEFINITION ID | ORG ID | ENTITY NAME | KEY PREFIX |
|---|---|---|---|
| 1 | 00d1 | TEST TABLE | a01 |
| 2 | 00d1 | ACCOUNTS | a02 |
| 3 | 00d1 | VEHICLES | a03 |
| 4 | 00d2 | SALES | a01 |
| 5 | 00d2 | ACCOUNTS | a02 |
| . | . | . | . |
| . | . | . | . |
| . | . | . | . |

| ENTITY ID | VAL 0 | ... | VAL 72 (FOREIGN KEY) | VAL 249 |
|---|---|---|---|---|
| a21...1 | | | a01...1 | |
| a21...2 | | | a01...2 | |
| a21...3 | | | a01...3 | |
| a21...4 | | | a01...4 | |

| FIELD DEFINITION ID | ORG ID | ENTITY NAME | FIELD NAME | FIELD DATA TYPE | COLUMN NUMBER |
|---|---|---|---|---|---|
| 1 | 00d1 | OBJECT A | ADDRESS | TEXT | 4 |
| 2 | 00d1 | OBJECT F | PHONE | NUMBER | 8 |
| 3 | 00d1 | OBJECT B | COMPANY | FOREIGN KEY (A) | 72 |

902 →
904: ENTITY ID: a21...1, a21...2, a21...3, a21...4
VAL 0
906 → VAL 72 (FOREIGN KEY): a01...1, a01...2, a01...3, a01...4
950 → VAL 104 (FOREIGN KEY): [EMPTY]

| 922 FIELD DEFINITION ID | 924 ORG ID | 926 ENTITY NAME | 928 FIELD NAME | 930 FIELD DATA TYPE | 932 COLUMN NUMBER |
|---|---|---|---|---|---|
| 1 | 00d1 | OBJECT A | ADDRESS | | 4 |
| 2 | 00d1 | OBJECT F | PHONE | | 8 |
| 3 | 00d1 | OBJECT B | COMPANY | FOREIGN KEY (A) | 104 |

934

TRUNCATING DATA ASSOCIATED WITH OBJECTS IN A MULTI-TENANT DATABASE

CROSS-REFERENCE TO RELATED APPLICATION

This application claims the benefit of U.S. provisional patent application Ser. No. 61/503,750, filed Jul. 1, 2011.

TECHNICAL FIELD

Embodiments of the subject matter described herein relate generally to data processing systems and techniques, such as systems and processes that use a common network-based platform to support applications executing on behalf of multiple tenants. More particularly, embodiments of the subject matter relate to a technique to virtually remove all data from a database object in an instantaneous manner.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system wherein a single hardware and software platform simultaneously supports multiple user groups (also referred to as "organizations" or "tenants") from a common data store. The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Certain operations that are common or routinely executed in a traditional database environment may be difficult or impractical to execute in a multi-tenant database architecture. For example, a standard "Truncate" operation cannot be effectively utilized in a multi-tenant database architecture where database objects for different tenants are maintained in a common table. Consequently, it may require a significant amount of time to physically delete a large amount of data from a database object maintained in a multi-tenant database system. For example, it may require hours or days of system time to physically delete a large database object that includes millions of rows of data, due to the nature of the multi-tenant environment, limitations of a database management application, or the like. For various reasons, database users would prefer to have deleted data removed from a database object as quickly as possible. One possible workaround for this scenario is to drop and recreate a custom object. Unfortunately, this workaround is not ideal because the user must rework any associated applications and customizations to refer to the new custom object.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is a diagram that depicts an exemplary embodiment of an entity definition table;

FIG. 9 is a diagram that depicts a portion of an exemplary custom entity table having foreign key entries;

FIG. 10 is a diagram that depicts an exemplary embodiment of a field definition table;

FIG. 11 is a diagram that depicts a portion of the custom entity table shown in FIG. 9 immediately following a truncation operation associated with a source object to which the foreign keys refer; and FIG. 12 is a diagram that depicts an updated version of the field definition table shown in FIG. 10.

DETAILED DESCRIPTION

The exemplary embodiments presented here relate to a data removal or truncation operation suitable for use in a computer-implemented system. The described subject matter can be implemented in the context of any computer-implemented system, such as a software-based system, a database system, a multi-tenant environment, or the like. Moreover, the described subject matter could be implemented in connection with two or more separate and distinct computer-implemented systems that cooperate and communicate with one another.

The feature described here provides for the relatively instantaneous removal of entries (rows of data) from a database object. Instantaneous removal of the data associated with a database object is achieved by modifying metadata for the data entries. In particular, the key prefix that is associated with all data entries of the database object is changed to a new and unused key prefix. After changing the key prefix in this manner, there will be no data entries having the new key prefix, which gives the appearance of a complete data deletion operation. In certain implementations, the system provides no option to recover the truncated data. In other implementations, the system creates and maintains a soft deleted object that includes the data for a period of time before physically deleting the data.

Figure 1:
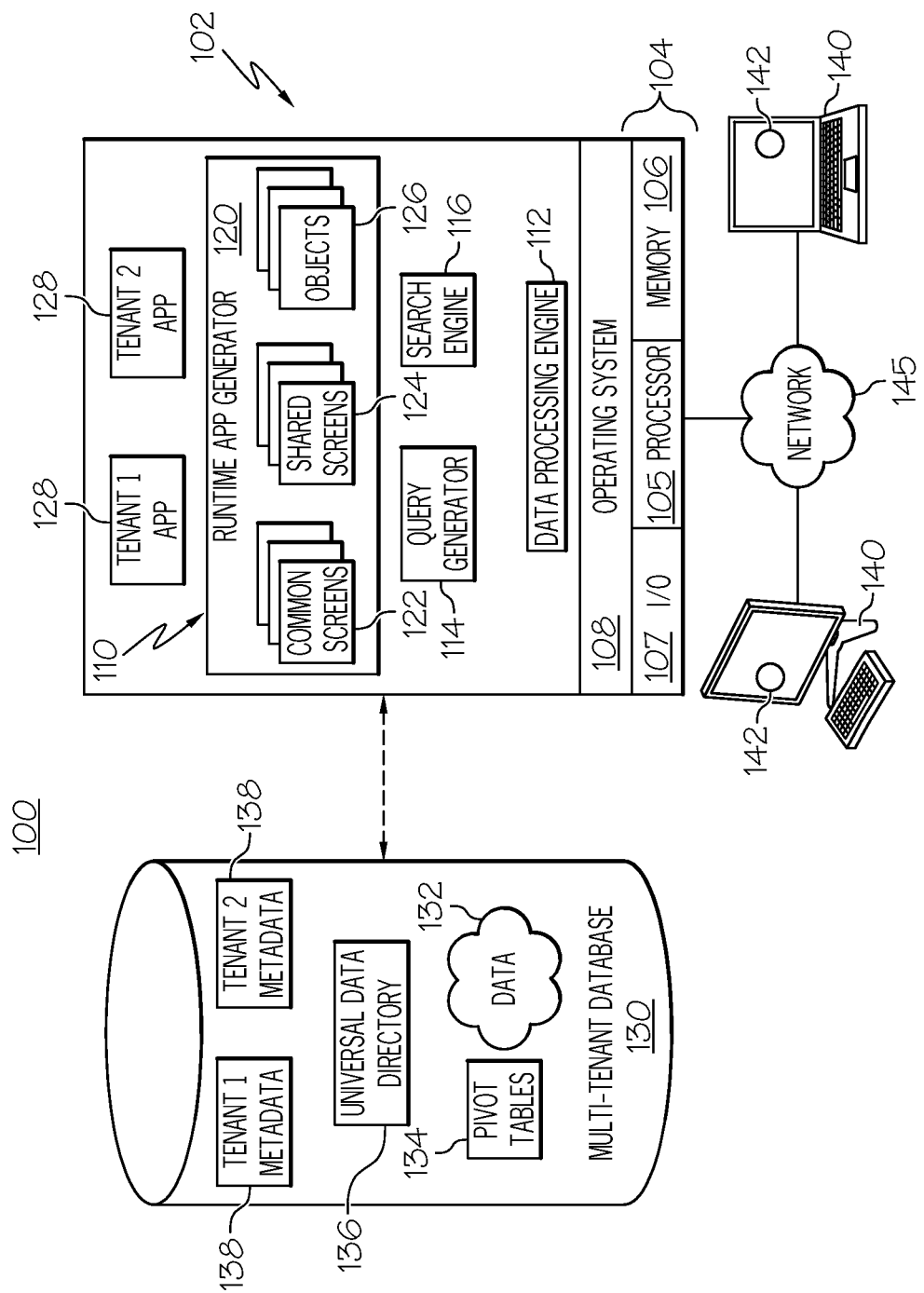
FIG. 1 is a block diagram of an exemplary multi-tenant data processing system.

Turning now to FIG. 1, an exemplary multi-tenant application system 100 suitably includes a server 102 that dynamically creates virtual applications 128 based upon data 132 from a common database 130 that is shared between multiple tenants. Data and services generated by the virtual applications 128 are provided via a network 145 to any number of user devices 140, as desired. Each virtual application 128 is suitably generated at run-time using a common application platform 110 that securely provides access to the data 132 in the database 130 for each of the various tenants subscribing to the system 100. In accordance with one non-limiting example, the system 100 may be implemented in the form of a multi-tenant customer relationship management system that can support any number of authenticated users of multiple tenants.

A "tenant" or an "organization" generally refers to a group of users that shares access to common data within the database 130. Tenants may represent customers, customer departments, business or legal organizations, and/or any other entities that maintain data for particular sets of users within the system 100. Although multiple tenants may share access to the server 102 and the database 130, the particular data and services provided from the server 102 to each tenant can be securely isolated from those provided to other tenants. The multi-tenant architecture therefore allows different sets of users to share functionality without necessarily sharing any of the data 132.

The database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

Figure 2:
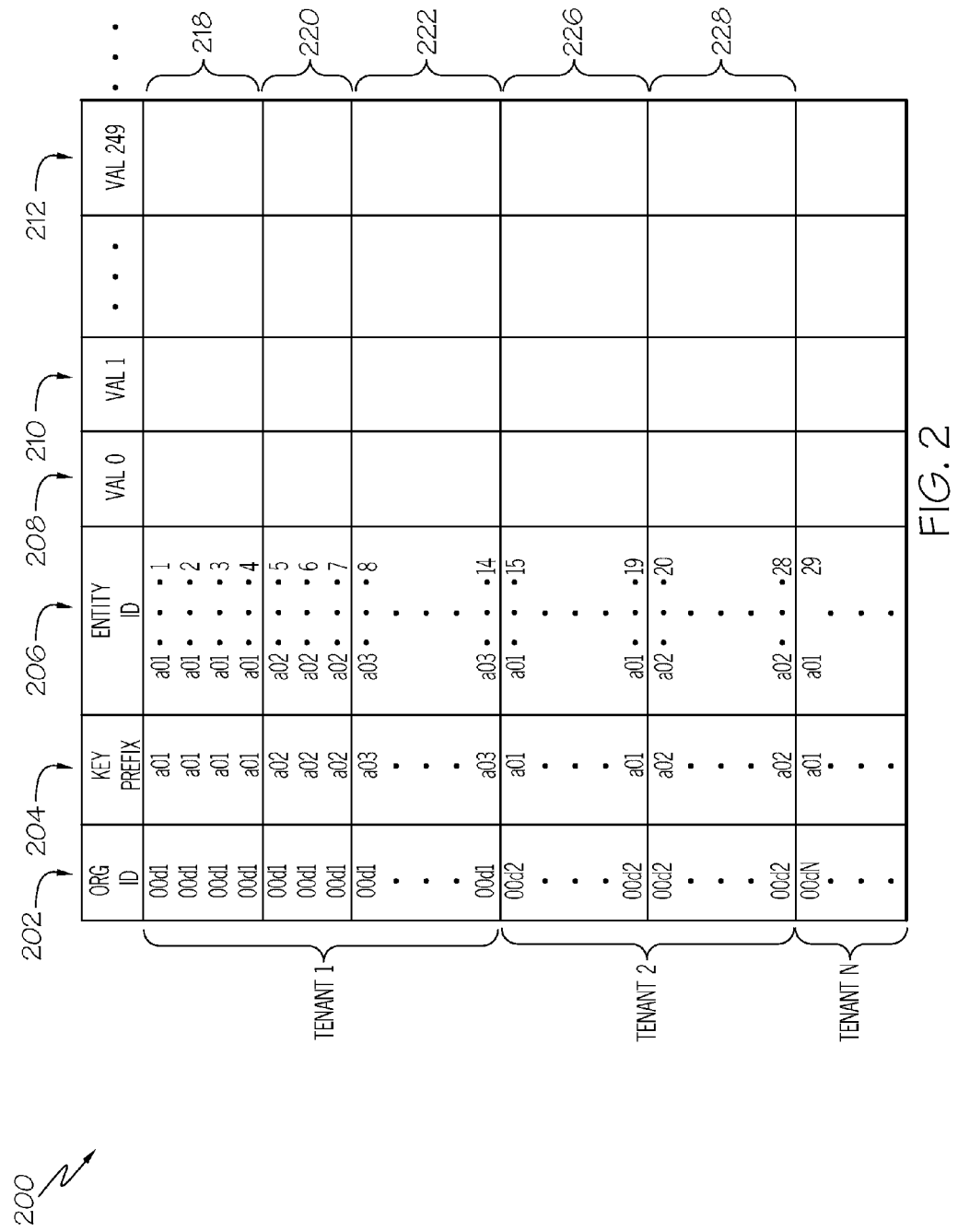
FIG. 2 is a diagram that depicts an exemplary embodiment of a custom entity table.

The data 132 may be organized and formatted in any manner to support the application platform 110 (see, for example, FIG. 2 and the accompanying description). In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired.

Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

For the exemplary embodiment described in more detail below with reference to FIGS. 2-8, the database 130 is used to store standard database objects (which may be considered to be "template" data tables that are relatively inflexible in format) and custom database objects (which can be customized to suit the needs of a particular tenant, or to suit the needs of certain users of a particular tenant). Accordingly, the data 132 may include database objects for a plurality of different tenants. Moreover, metadata within the UDD 136 and/or the tenant-specific metadata 138 may be descriptive of, or otherwise associated with, entries (e.g., table rows) in the database objects maintained by the system 100.

The server 102 is implemented using one or more actual and/or virtual computing systems that collectively provide the dynamic application platform 110 for generating the virtual applications 128. The server 102 operates with any sort of conventional processing hardware 104, such as a processor 105, memory 106, input/output features 107 and the like. The processor 105 may be implemented using one or more of microprocessors, microcontrollers, processing cores and/or other computing resources spread across any number of distributed or integrated systems, including any number of "cloud-based" or other virtual systems. The memory 106 represents any non-transitory short or long term storage capable of storing programming instructions for execution on the processor 105, including any sort of random access memory (RAM), read only memory (ROM), flash memory, magnetic or optical mass storage, and/or the like. The server 102 typically includes or cooperates with some type of computer-readable media, where a tangible computer-readable medium has computer-executable instructions stored thereon. The computer-executable instructions, when read and executed by the server 102, cause the server 102 to perform certain tasks, operations, functions, and processes described in more detail herein. In this regard, the memory 106 may represent one suitable implementation of such computer-readable media. Alternatively or additionally, the server 102 could receive and cooperate with computer-readable media (not separately shown) that is realized as a portable or mobile component or platform, e.g., a portable hard drive, a USB flash drive, an optical disc, or the like.

The input/output features 107 represent conventional interfaces to networks (e.g., to the network 145, or any other local area, wide area or other network), mass storage, display devices, data entry devices and/or the like. In a typical embodiment, the application platform 110 gains access to processing resources, communications interfaces and other features of the processing hardware 104 using any sort of conventional or proprietary operating system 108. As noted above, the server 102 may be implemented using a cluster of actual and/or virtual servers operating in conjunction with each other, typically in association with conventional network communications, cluster management, load balancing and other features as appropriate.

The application platform 110 is any sort of software application or other data processing engine that generates the virtual applications 128 that provide data and/or services to the user devices 140. The virtual applications 128 are typically generated at run-time in response to queries received from the user devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the user devices 140. The virtual applications 128 created by tenants are typically constructed in accordance with the tenant-specific metadata 138, which describes the particular tables, reports, interfaces and/or other features of the particular application. In various embodiments, each virtual application 128 generates dynamic web content that can be served to a browser or other client program 142 associated with its user device 140, as appropriate. As used herein, such web content represents one type of resource, data, or information that may be protected or secured using various user authentication procedures.

The runtime application generator 120 suitably interacts with the query generator 114 to efficiently obtain multi-tenant data 132 from the database 130 as needed. In a typical embodiment, the query generator 114 considers the identity of the user requesting a particular function, and then builds and executes queries to the database 130 using system-wide metadata, tenant specific metadata 138, pivot tables 134, and/or any other available resources. The query generator 114 in this example therefore maintains security of the common database 130 by ensuring that queries are consistent with access privileges granted to the user that initiated the request.

The data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc. In certain embodiments, the data processing engine 112 and the processor 105 cooperate in an appropriate manner to perform and manage the various data truncation and deletion operations, as described in more detail below with reference to FIGS. 2-8.

In operation, developers use the application platform 110 to create data-driven virtual applications 128 for the tenants that they support. Such virtual applications 128 may make use of interface features such as tenant-specific screens 124, universal screens 122 or the like. Any number of tenant-specific and/or universal objects 126 may also be available for integration into tenant-developed virtual applications 128. The data 132 associated with each virtual application 128 is provided to the database 130, as appropriate, and stored until it is requested or is otherwise needed, along with the metadata 138 that describes the particular features (e.g., reports, tables, functions, etc.) of that particular tenant-specific virtual application 128.

The data and services provided by the server 102 can be retrieved using any sort of personal computer, mobile telephone, portable device, tablet computer, or other network-enabled user device 140 that communicates via the network 145. Typically, the user operates a conventional browser or other client program 142 to contact the server 102 via the network 145 using, for example, the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. The query generator 114 suitably obtains the requested data 132 from the database 130 as needed to populate the tables, reports or other features of the particular virtual application 128. As noted above, the virtual application 128 may contain Java, ActiveX, or other content that can be presented using conventional client software running on the user device 140; other embodiments may simply provide dynamic web or other content that can be presented and viewed by the user, as desired.

An embodiment of the system 100 may leverage the query optimization techniques described in U.S. Pat. No. 7,529,728 and/or the custom entities and fields described in U.S. Pat. No. 7,779,039. The content of these related patents is incorporated by reference herein. In this regard, the multi-tenant database 130 can generally be viewed as a collection of objects, such as a set of logical tables, containing data fitted into predefined categories. Accordingly, a "table" is one representation of a database object, and tables may be used herein to simplify the conceptual description of objects and custom objects. It should be understood that "table" and "object" may be used interchangeably herein. Each table generally contains one or more data categories logically arranged as columns or fields in a viewable schema. Each row, entry, or record of a table contains an instance of data for each category defined by the fields. For example, a customer relationship management (CRM) database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided. For example, a CRM database application may provide standard entity tables for Account, Contact, Lead, and Opportunity data, each containing pre-defined fields.

Regarding custom entities, FIG. 2 is a diagram that depicts an exemplary embodiment of a custom entity table 200. In practice, the custom entity table 200 can be maintained, updated, and managed by a multi-tenant system such as the system 100 described above. A custom entity table allows a tenant to extend a base application or to integrate with other systems. For example, an organization using standard entities provided by the system may desire that one or more new custom entities be created to specifically cater to, and to facilitate data storage and retrieval for, that organization's particular business model.

For the exemplary embodiment presented here, all custom entity data rows are stored in a single multi-tenant physical table. However, even though the custom entity table 200 may contain multiple logical tables per organization/tenant, that characteristic is transparent to the end users. For this particular example, the custom entity table 200 includes the following columns, without limitation: an ORG ID column 202; a KEY PREFIX column 204; an ENTITY ID column 206; and a plurality of custom field columns 208, 210, 212 (labeled VAL_0, VAL_1, . . . VAL_249). Although this exemplary custom entity table 200 includes 250 custom fields, any practical number could be supported. The ORG ID column 202 is used to store a tenant identifier for the data entries (rows) in the custom entity table 200. In this way, the values in the ORG ID column 202 can be used to distinguish among the various tenants populating the custom entity table 200. For example, multiple tenants may create custom database objects, all of which are stored to the custom entity table 200. For this particular example, three database objects 218, 220, 222 are associated with Tenant 1 and, therefore, the entries for these database objects 218, 220, 222 share the same ORG ID value, namely, "00d1" (which appears in the ORG ID column 202). Similarly, the two database objects 226, 228 are associated with Tenant 2 and, therefore, their entries share the same ORG ID value of "00d2" (which appears in the ORG ID column 202). In practice, each distinct tenant will have a unique ORG ID value associated therewith.

The KEY PREFIX column 204 is used to store the key prefixes for the data entries maintained in the custom entity table 200. Although not always required, the key prefixes in this example are three characters long. Notably, each database object in the custom entity table 200 can be identified by a unique combination of a key prefix and a tenant identifier. For example, the database object 218 is identified by the ORG ID value "00d1" and the key prefix "a01", the database object 222 is identified by the ORG ID value "00d1" and the key prefix "a03", and the database object 226 is identified by the ORG ID value "00d2" and the key prefix "a01". For this particular embodiment, a given key prefix can be assigned to only one database object for any one tenant. However, a specific key prefix (such as "a01") could be reused across different tenants, as shown in FIG. 2. Other embodiments may prohibit reuse of key prefixes across tenants.

Each entry in the custom entity table 200 is identified by, and is uniquely associated with, a respective entity identifier, which is globally unique throughout the custom entity table 200. The ENTITY ID column 206 is used to distinguish among the various custom database objects stored in the custom entity table 200. The ENTITY ID column 206 also acts as the primary key column for the custom entity table 200. Although not always required, the ENTITY ID column 206 stores an entity identifier that is fifteen characters long. Of course, shorter or longer entity identifiers could be utilized in an embodiment of the system. The custom field columns 208, 210, 212 are used to store the data for the various custom database objects defined by the various tenants.

A respective key prefix appears at the beginning of each entity identifier. For this example, the leading three characters of an entity identifier represents the key prefix for that data entry. It will be appreciated, however, that fewer or more than the first three characters of the primary key may be used to identify entities, or that any subcombination of characters of the primary key may be used. According to one embodiment, the key prefixes of the globally unique entity identifier values are used to identify the database objects. This technique advantageously allows for multiple custom entity types for one organization to be distinguished in a single custom entity table 200.

As mentioned above with reference to FIG. 1, the system preferably maintains metadata related to at least some of the entries in the multi-tenant database 130. For example, the system 100 preferably maintains an entity definition table having a plurality of metadata entries corresponding to the different database objects (in particular, the custom entities described here). Thus, when an organization administrator defines a new custom entity, the definition of the new custom entity is stored in the entity definition table instead of the underlying data dictionary. In this regard, FIG. 3 is a diagram that depicts an exemplary embodiment of a entity definition table 300 that contains metadata entries corresponding to at least a part of the custom entity table 200. In certain embodiments, only one entity definition table 300 is used to support the plurality of different organizations in a multi-tenant database system.

This implementation of the entity definition table 300 includes the following columns, without limitation: an ENTITY DEFINITION ID column 302; an ORG ID column 304; an ENTITY NAME column 306; and a KEY PREFIX column 308. The ENTITY DEFINITION ID column 302 contains a unique identifier string for each entry in the entity definition table 300, and the entity definition identifier is the primary key for the entity definition table 300. The ORG ID column 304 contains the tenant identifier (i.e., the ORG ID) for the database objects defined in the entity definition table 300. It should be appreciated that the content of the ORG ID column 304 tracks the content of the ORG ID column 202 of the custom entity table 200. The ENTITY NAME column 306 may be used to store a name, a label, or other identifier for the defined database objects, e.g., as a text datatype. The KEY PREFIX column 308 contains the key prefixes assigned to the defined database objects. Notably, the content of the KEY PREFIX column 308 tracks the content of the KEY PREFIX column 204 of the custom entity table 200.

When a new custom entity is defined for a particular organization, the database system allocates a unique (within that organization) three-character key prefix for rows of that entity type. In one aspect, the letter "a" is chosen as the first character of all custom entity primary keys, e.g., "a01" . . . "a02" . . . "a03" . . . "aMN". As mentioned previously, across all organizations the same key prefix may be reused. For example, "a01" is reused as a key prefix for both Tenant 1 and Tenant 2, as shown in FIG. 2. The remainder of the custom entity identifier, i.e., the portion that follows the key prefix, ensures global uniqueness (and that data from different organizations is never mingled), as explained above with reference to the custom entity table 200. In one aspect, the three-character key prefixes are encoded in Base62, so that each initial character allows for 3,844 different custom entity types per organization, which is a large enough number for virtually all uses. It should be appreciated, however, that different encoding bases and schemes may be used to provide a fewer or greater number of custom entity types per organization. It should also be appreciated that the entity identifier field may be a composite primary key, for example, spanning two or more columns, one column for the prefix and the other column(s) for the remainder of the custom entity identifier.

When creating a custom entity table, the administrator for an organization specifies a unique (within the organization) developer name for the custom entity—this is the name used to identify that particular entity for API calls and other developer entry points into the system. This name is stored in the ENTITY NAME column 306 of the entity definition table 300. Custom fields may also be defined for custom entities, and where desired, custom fields may be flagged for indexing. Once custom fields are defined for the custom entity, the organization can begin to use that custom entity like any other standard entity. For example, all API operations (e.g., describe, insert, update, delete, query, search) are available and the organization may define a user interface for editing that custom entity in an online application. Transparent to the users and organization, however, the custom database object is stored in a single custom entity table 200 along with other custom database objects, which have definitions in the entity definition table 300.

Figure 4:
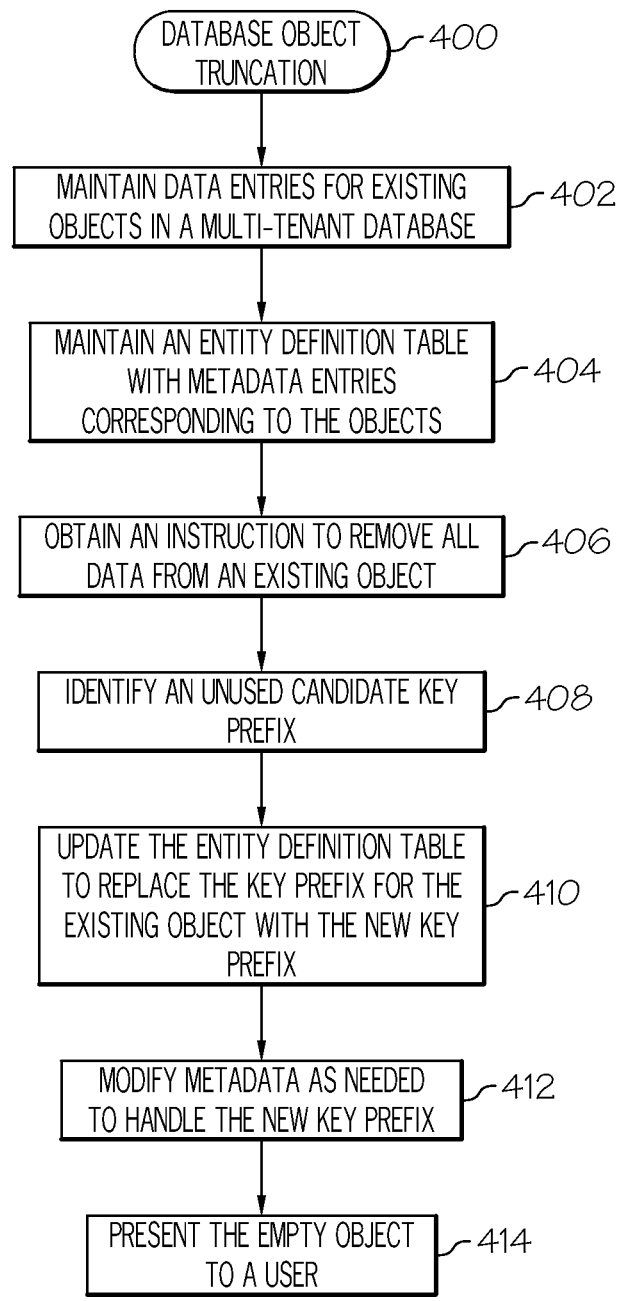
FIG. 4 is a flow chart that illustrates an exemplary embodiment of a database object truncation process.

As mentioned above, it can be very time consuming or otherwise difficult to delete all entries of a database object for a given organization in a multi-tenant architecture using conventional methodologies. Moreover, a traditional "Truncate" operation cannot be directly applied to a multi-tenant database table because such an operation would empty all records for all database objects for all tenants, which is not the desired intent. The technique described here is an effective and elegant way to accomplish a truncation operation in a multi-tenant system in a virtually instantaneous manner as perceived by the user. In this regard, FIG. 4 is a flow chart that illustrates an exemplary embodiment of a database object truncation process 400, which may be performed by the system 100. The various tasks performed in connection with a process described herein may be performed by software, hardware, firmware, or any combination thereof. In other words, the process 400 may represent a computer-implemented method to truncate or remove data that is associated with a database object maintained by a multi-tenant database system. For illustrative purposes, the description of a process may refer to elements mentioned above in connection with FIGS. 1-3. In practice, portions of a described process may be performed by different elements of the described system, e.g., the server 102, a user device 140, or the data processing engine 112. It should be appreciated that a described process may include any number of additional or alternative tasks, the tasks shown in the figures need not be performed in the illustrated order, and a process may be incorporated into a more comprehensive procedure or process having additional functionality not described in detail herein. Moreover, one or more of the tasks shown in the figures could be omitted from an embodiment of a process as long as the intended overall functionality remains intact.

Figure 5:
FIG. 5 is a diagram that illustrates the relationship between an existing database object and its data entries.

In connection with the database object truncation process 400, the system maintains data entries for one or more existing database objects in a multi-tenant database (task 402). For this embodiment, the system also maintains at least one entity definition table that includes metadata entries corresponding to the database objects of interest (task 404). The process 400 will be described in the context of an example where the multi-tenant system stores and maintains a custom database object named "Test Table" for a given organization (Tenant 1), and the "Test Table" object has corresponding entry in the entity definition table. FIG. 5 is a diagram that illustrates the relationship between an existing database object 502a named "Test Table" and its data entries 504 (note that the database object 502a corresponds to the database object 218 shown in FIG. 2, and to the entity definition 318 shown in FIG. 3). Before initiating the truncation operation, the "Test Table" database object 502a is characterized and identified by the key prefix "a01". Accordingly, the data entries 504 associated with the "Test Table" database object 502 have entity identifiers that begin with the key prefix "a01".

Referring again to FIG. 4, this example assumes that the process 400 obtains a suitably formatted instruction or command to remove all of the stored data from an existing database object (task 406). In other words, the existing database object is to be truncated to accommodate the entry of new data. Notably, this truncation operation is not intended to completely delete the database object itself. Rather, this operation is intended to quickly clear all of the data entries while preserving certain relationships, applications, settings, and/or other parameters associated with the database object. In practice, the system may receive an instruction that is initiated by a user of a client device.

In response to the truncation instruction, the process 400 initiates a procedure that effectively results in a virtually instantaneous "deletion" of data for the user. This procedure may begin by scanning or searching the key prefixes of the stored data to identify at least one unused candidate key prefix (task 408). As will become apparent from the following description, an "unused" key prefix refers to a key prefix that is not currently being used to identify any other database object for the organization to which the existing database object is assigned. In other words, if the database object that is being subjected to the truncation operation is "owned" by Tenant 1 (see FIG. 2), then task 408 determines that the key prefixes "a01", "a02", and "a03" are already in use by Tenant 1. Accordingly, task 408 might identify any other key prefix as an unused candidate key prefix, such as: "a04", "a08", "a24", etc.

For this example, it is assumed that task 408 simply identifies the next available unused key prefix (namely, "a04") to be used as the new key prefix for the database object being truncated. The process 400 then proceeds to update the respective metadata entry in the entity definition table to replace the old key prefix "a01" with the new key prefix "a04", which is not currently associated with any other database object for this particular tenant (task 410). In practice, updating the metadata for the database object disassociates the previously stored data from the old key prefix, and effectively results in an updated database object that is identified by the new key prefix and the same tenant identifier. For this example, the entity definition 318 shown in FIG. 3 would be updated to change the key prefix value from "a01" to "a04". Changing the key prefix to an unused key prefix in this manner may also result in the modification of additional metadata where necessary (task 412). In certain implementations, the metadata is altered to allow the metadata layer to fully recognize that "a04" is a key prefix to be used by this database object. Conceptually, these tasks effectively "empty" the database object such that it resembles a shell or template table with no user data.

Figure 6:
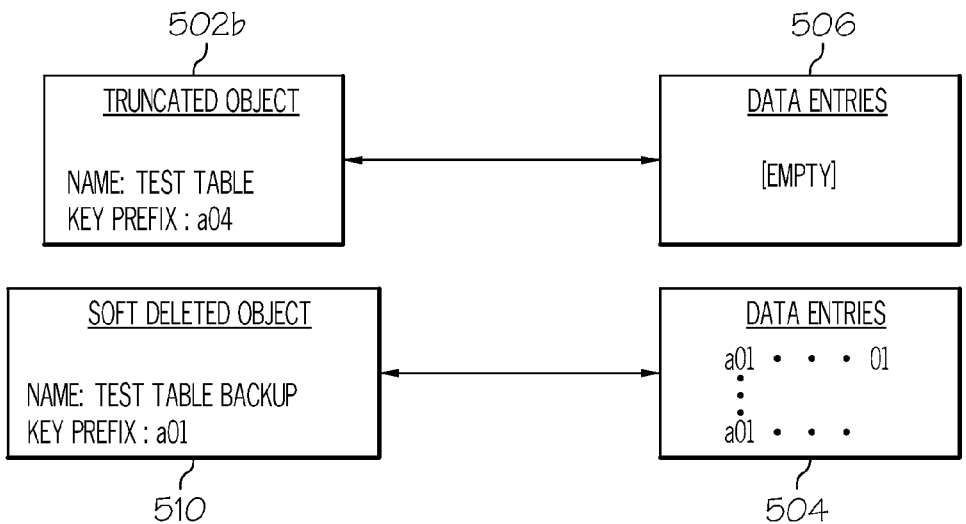
FIG. 6 is a diagram that illustrates a truncation operation applied to the database object shown in FIG. 5.

FIG. 6 is a diagram that illustrates the truncation operation applied to the original database object 502a shown in FIG. 5. The truncated object 502b retains the name "Test Table", but the new key prefix "a04" has been assigned to the truncated "Test Table" database object 502b. At this time, the object 502b appears to be empty (as represented by the "empty" data entries 506) because the new key prefix has not yet been utilized to identify any rows of data. In certain embodiments, the process 400 initiates the presentation or display of the now-emptied object to a user (task 414) to accommodate ongoing data entry and/or use of the database object 502 as desired. For example, the process 400 may generate or update a suitably formatted graphical representation of a table, a form, a web page, or the like, to reflect the empty database object. The graphical content can then be provided to a device or system for presentation to the user. The truncation procedure described here allows the user to immediately perceive that all of the data has been deleted from the database object 502a, whether or not the data has actually and physically been deleted. Thus, the newly truncated database object 502b can now be repopulated with new data.

Figure 7:
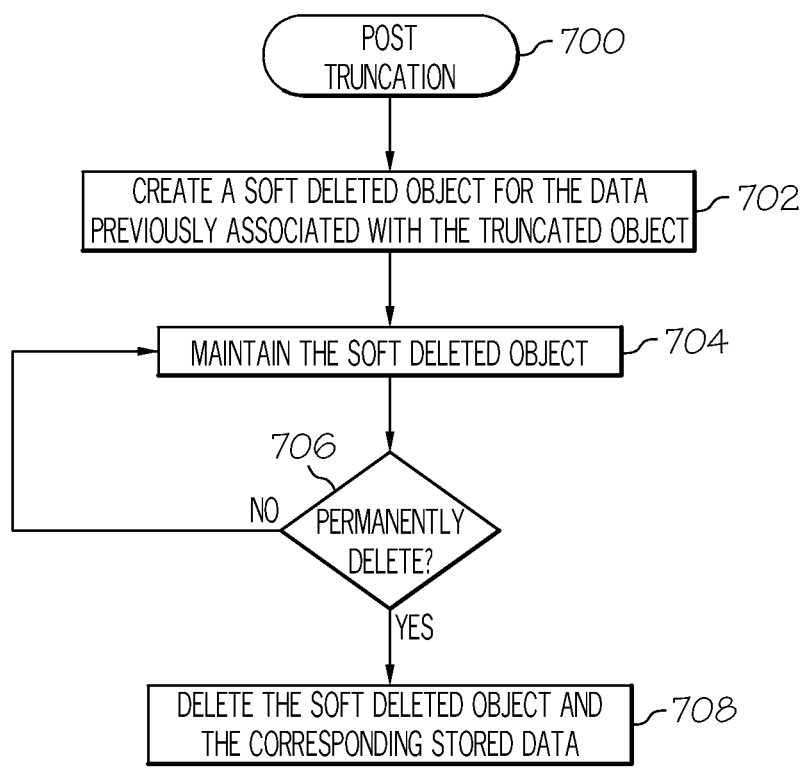
FIG. 7 is a diagram that illustrates post-truncation operations associated with the truncated database object shown in FIG. 6.

After a database object is truncated in the manner described here, the system may perform related operations as needed. In this regard, FIG. 7 is a flow chart that illustrates an exemplary embodiment of a post-truncation process 700, which may be performed in conjunction with, or following, the process 400. This particular embodiment assumes that the system responds to a truncation operation by creating a soft deleted database object for the stored data that was previously associated with the truncated object (task 702). The soft deleted database object is identified by the old key prefix and the same tenant identifier. Referring again to FIG. 6, a soft deleted object 510 is depicted in association with the data entries 504 that were previously linked to the "Test Table" database object 502a. The soft deleted object 510 may be given any arbitrary name, such as "Test Table Backup". As shown in FIG. 6, the soft deleted object 510 is associated with the old key prefix of the "Test Table" database object 502a ("a01"). Consequently, the data entries 504 have been preserved and need not be physically deleted to accomplish the truncation operation.

The process 700 can maintain the soft deleted object (task 704) for an indefinite amount of time, for a designated period of time (e.g., ninety days, a week, or a year), or until instructed to permanently delete the data entries. For example, the soft deleted object or the data associated therewith could be automatically deleted after a specified time period ends, such as thirty days after creation of the soft deleted object. As another example, the soft deleted object or the data associated therewith could be maintained until a user enters a command to physically delete the object/data. If the process 700 determines that it is time to permanently remove the soft deleted object/data (the "Yes" branch of query task 706), then the process 700 continues by physically deleting the soft deleted object and the corresponding stored data (task 708) from the database. After physically deleting the soft deleted object and related data, the "old" key prefix (which no longer has any context or data linked thereto) could be reused in a subsequent truncation operation. In other words, the "old" key prefix could be subsequently designated as a "new and unused" key prefix going forward. The physical deletion of the data need not be temporally linked to the truncation operation in any way, and the physical deletion of the data may be performed at any convenient time and when system resources are available. In other words, the user need not be inconvenienced by any delay associated with the permanent deletion of the data, because the truncated object has already been provided to the user for repopulation. After this physical deletion, the data will be unrecoverable.

Figure 8:
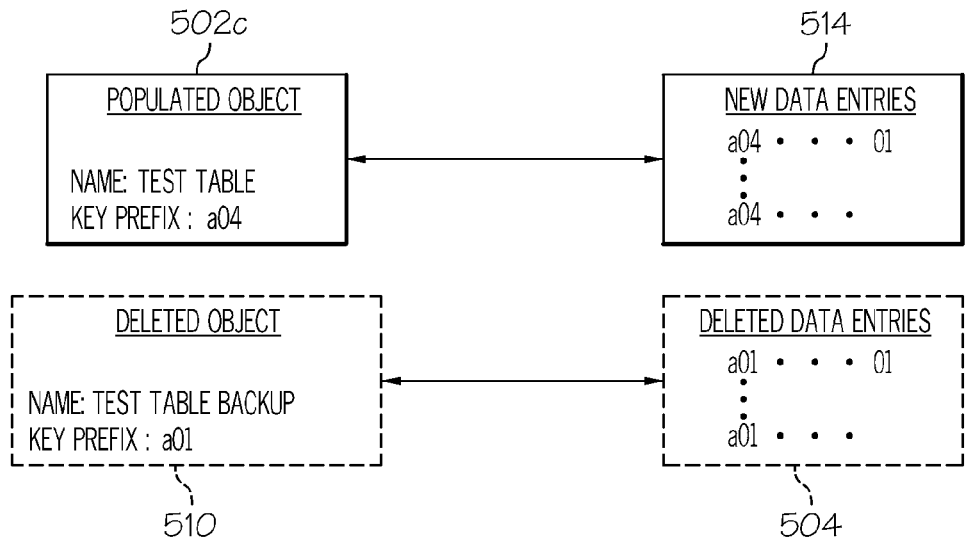
FIG. 8 is a flow chart that illustrates an exemplary embodiment of a post-truncation process.

FIG. 8 is a diagram that illustrates certain post-truncation operations associated with the truncated database object 502b shown in FIG. 6. FIG. 8 depicts a repopulated version of the database object 502c, which still retains the original name "Test Table". In contrast to the truncated state depicted in FIG. 6, the populated "Test Table" database object 502c now has new data entries 514 associated therewith. All of the data entries 514 associated with the populated "Test Table" database object 502c have entity identifiers that begin with the new key prefix "a04".

FIG. 8 also depicts the permanent deletion of the soft deleted object 510 and its associated data entries 504. The dashed lines in FIG. 8 indicate the deleted status of the object 510 and the data entries 504. Going forward, the "Test Table" database object 502c can be maintained, managed, and processed in a conventional manner. Moreover, the "Test Table" database object 502c may in turn be subjected to another truncation operation if so desired.

The example described above contemplates the simple and straightforward scenario where the original database object does not contain any data entries that are linked to foreign keys in other database objects. If, however, the original database object includes an entry that is linked to a foreign key maintained in a different database object (e.g., a target database object or a source database object), then additional measures may need to be taken in response to a truncate instruction for the original database object. In accordance with one simple approach, the system prohibits truncation operations on an object if any entry in that object is referenced by a foreign key in another object. Such a prohibition ensures that truncation of an object will not corrupt or otherwise impact any foreign keys maintained in another object. Although effective in preserving the integrity of the database objects having foreign keys pointing to another database object, this approach is not viable in a practical implementation where foreign keys and cross references between database objects are commonplace.

In accordance with another approach, foreign keys that point to entries in a truncated database object are managed by manipulating metadata to effectively "remove" the foreign keys and set their data values to null. Thus, a truncation operation on Object A results in modifications to Object B (when Object B contains foreign keys that point to Object A). For example, assume that the old key prefix for Object A was "a01", Object B includes foreign keys beginning with the key prefix "a01", and Object A is subjected to truncation such that the old key prefix is no longer valid. In this context, FIG. 9 is a diagram that depicts a portion of an exemplary custom entity table 902 having foreign key entries. In practice, the custom entity table 902 may have additional columns and rows, as explained above with reference to FIG. 2 and FIG. 3.

FIG. 9 highlights entries corresponding to Object B (identified by reference number 904). For this example, the entries in Object B begin with the key prefix "a21" and Object B includes a custom field column 906 (corresponding to VAL_72) that contains a foreign key pointing to Object A. Although Object A is not shown in FIG. 9, the foreign key entries for Object B are consistent with the entries beginning with the key prefix "a01" for Tenant 1 (see FIG. 2).

FIG. 10 is a diagram that depicts an exemplary embodiment of a field definition table 920 that contains metadata entries corresponding to at least a part of the custom entity table 902. In certain embodiments, only one field definition table 920 is used to support the plurality of different organizations in a multi-tenant database system. This embodiment of the field definition table 920 includes the following columns, without limitation: a FIELD DEFINITION ID column 922; an ORG ID column 924; an ENTITY NAME column 926; a FIELD NAME column 928; a FIELD DATA TYPE column 930; and a COLUMN NUMBER column 932. The FIELD DEFINITION ID column 922 contains a unique identifier string for each entry in the field definition table 920, and the field definition identifier is the primary key for the field definition table 920. The ORG ID column 924 contains the tenant identifier (i.e., the ORG ID) for the corresponding database objects, and the ENTITY NAME column 926 may be used to store a name, a label, or other identifier for the database objects, as described above with reference to FIG. 3. For consistency with the foreign key example presented here, the entity names are simply referred to as Object A, Object B, and so on.

The FIELD NAME column 928 contains a name, a label, or text that describes or explains the content of the fields defined in the field definition table 902. The FIELD DATA TYPE column 930 is used to specify the particular data type for the custom fields, e.g., text, number, date, foreign key, or picklist. The COLUMN NUMBER column 932 stores the column number or VAL number assigned to a custom field in the field definition table 920. For this simplified example, the entry 934 (corresponding to the field definition "3") defines the foreign key field at VAL_72 for Object B. In other words, the entry 934 is consistent with the custom entity table 902 depicted in FIG. 9.

As mentioned above, the metadata maintained in the field definition table 920 can be changed to accommodate a truncation operation on Object A, where Object B contains foreign keys that reference entries in Object A. In this regard, FIG. 11 is a diagram that depicts a portion of the custom entity table 902 immediately following truncation of Object A, and FIG. 12 is a diagram that depicts an updated version of the field definition table 920. In response to the truncation of Object A, the field definition table 920 is altered to assign a previously unused column number (VAL_104 in this example) to the entry 934, while effectively rendering the previously used column number (VAL_72) undefined and unavailable. As shown in FIG. 12, the entry 934 no longer indicates column number VAL 72; the entry 934 now includes the column number VAL 104. In practice, the system can search for any currently unused and available field column number for use as the replacement field column number. For simplicity, the system preferably selects the next available and unused field column number for purposes of swapping with the currently defined and designated field column number associated with the foreign keys.

FIG. 11 depicts the state of the custom entity table 902 immediately following the updating of the field definition table 920. At this time, the custom field column 906 is undefined and in "limbo" because VAL_72 no longer appears in the field definition table 920. Accordingly, FIG. 11 depicts the custom field column 906 surrounded in dashed lines to indicate that VAL_72 no longer has any contextual meaning or relevance for Object B. Notably, FIG. 11 depicts a new custom field column 950 that corresponds to the newly defined VAL_104. At this time, the custom field column 906 is empty because the newly assigned column number (VAL_104) has not yet been utilized to identify any foreign key values. In other words, the metadata for Object B has been intelligently manipulated in a way that makes it appear as though all of foreign keys pointing to Object A have been truncated with the truncation of Object A.

In accordance with an alternative approach to handle the foreign key scenario described above, in response to the truncation of Object A, the system scans the data entries of Object B to find any foreign keys that begin with the prefix "a01" and sets those data values to null, while preserving any remaining data fields. Although this simple approach is also effective, it can be time consuming if Object B contains a vast number of foreign key entries.

As an alternative to the "set to null" approach described above, the presence of foreign keys that point to a truncated database object can be handled via a cascaded delete operation. In accordance with the "cascade" approach, a truncation operation on Object A results in the deletion (soft or permanent) of entries in Object B that include foreign keys pointing to Object A. In contrast to the "set to null" approach, cascaded deletion results in the complete removal of one or more rows in Object B. In practice, if a foreign key field that points to Object A is a required field in Object B (i.e., each record in Object B must include a non-null value in the foreign key field that refers to Object A), then the entire Object B can be recursively truncated in response to the truncation of Object A. The recursive nature of this operation may be required because there may be an Object C that has a foreign key relationship to Object B, which causes Object C to be truncated as well.

In certain scenarios, a database object to be truncated may include entries that are linked to summary field values maintained in entries of other database objects. For example, Object A may include a field for sales amounts, and Object B may include a roll-up summary field that is defined as the sum of the sales amounts from Object A. As another example, Object B may include a summary field that is defined by a formula that points to a field in Object A and a field in Object C. If Object A is subjected to a truncation operation as described here, then any related summary field in Object B will become undefined. In accordance with one exemplary approach, summary fields in Object B are handled by scanning the entries of Object B for the presence of summary fields that refer to entries in Object A, and then adjusting those summary field values in Object B to reflect the deletion of the corresponding records in Object A. If a summary field in Object B represents a mathematical sum of values only taken from Object A, then this approach could employ a simple zeroing feature (e.g., forcing null values for the summary field in Object B). In contrast, if a summary field in Object B is dependent on values taken from a plurality of different database objects, then this approach may require more processing resources to adjust the summary field values in Object B.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

What is claimed is:

1. A computer-implemented method of removing stored data associated with a database object, the method comprising:

assigning a new and previously unused key prefix to an existing database object to disassociate stored data from an old key prefix, resulting in an empty database object that is void of data;

updating a graphical representation of a table to reflect the empty database object; and presenting the graphical representation of the table to a user, wherein:

each entry in the existing database object is uniquely associated with a respective custom entity identifier that begins with the old key prefix; and each entry in the updated database object is uniquely associated with a respective custom entity identifier that begins with the new and previously unused key prefix.

2. The computer-implemented method of claim 1, further comprising:
creating a soft deleted database object that includes the stored data associated with the old key prefix; and
maintaining the soft deleted database object for a time period after assigning the new and previously unused key prefix to the existing database object.

3. The computer-implemented method of claim 2, further comprising deleting the stored data associated with the old key prefix after the time period ends.

4. The computer-implemented method of claim 2, further comprising deleting the soft deleted database object after the time period ends.

5. The computer-implemented method of claim 1, further comprising repopulating the updated database object with new data.

6. A computer-implemented method of removing stored data associated with a database object, the method comprising:
assigning a new and previously unused key prefix to an existing database object to disassociate stored data from an old key prefix, resulting in an empty database object that is void of data;
updating a graphical representation of a table to reflect the empty database object and
presenting the graphical representation of the table to a user, wherein:
the existing database object includes a first entry that is linked to a foreign key maintained in a second entry of a target database object, the foreign key stored in a field identified by a first column number; and
the method further comprises altering metadata for the second entry of the target database object by replacing the first column number with a new and previously unused column number, in response to assigning the new and previously unused key prefix to the existing database object.

7. A computer-implemented method of removing stored data associated with a database object, the method comprising:
assigning a new and previously unused key prefix to an existing database object to disassociate stored data from an old key prefix, resulting in an empty database object that is void of data;
updating a graphical representation of a table to reflect the empty database object; and
presenting the graphical representation of the table to a user, wherein:
the existing database object includes a first entry that is linked to a foreign key maintained in a second entry of a target database object; and
the method further comprises removing the second entry of the target database object, in response to assigning the new and previously unused key prefix to the existing database object.

8. A computer-implemented method of removing stored data associated with a database object, the method comprising:
assigning a new and previously unused key prefix to an existing database object to disassociate stored data from an old key prefix, resulting in an empty database object that is void of data;
updating a graphical representation of a table to reflect the empty database object; and
presenting the graphical representation of the table to a user, wherein:
the existing database object includes a first entry that is linked to a summary field value maintained in a second entry of a target database object; and
the method further comprises updating the summary field value in response to assigning the new and previously unused key prefix to the existing database object.

9. A computer-implemented method of removing stored data associated with a database object, the method comprising:
maintaining a custom entity definition table having a metadata entry corresponding to an existing database object;
assigning a new and previously unused key prefix to the existing database object to disassociate stored data from an old key prefix, resulting in an empty database object that is void of data;
updating a graphical representation of a table to reflect the empty database object; and
presenting the graphical representation of the table to a user, wherein:
the metadata entry includes the old key prefix in a key prefix field; and
assigning the new and previously unused key prefix comprises updating the metadata entry to include the new and previously unused key prefix in the key prefix field, to obtain an updated metadata entry that corresponds to the updated database object.

10. The computer-implemented method of claim 1, further comprising:
prior to assigning the new and previously unused key prefix, scanning the key prefixes of the stored data; and
in response to the scanning, determining a candidate key prefix to be used as the new and previously unused key prefix.

11. The computer-implemented method of claim 6, further comprising:
creating a soft deleted database object that includes the stored data associated with the old key prefix; and
maintaining the soft deleted database object for a time period after assigning the new and previously unused key prefix to the existing database object.

12. The computer-implemented method of claim 7, further comprising:
creating a soft deleted database object that includes the stored data associated with the old key prefix; and
maintaining the soft deleted database object for a time period after assigning the new and previously unused key prefix to the existing database object.

13. The computer-implemented method of claim 8, further comprising:
creating a soft deleted database object that includes the stored data associated with the old key prefix; and
maintaining the soft deleted database object for a time period after assigning the new and previously unused key prefix to the existing database object.

14. The computer-implemented method of claim 9, further comprising:
creating a soft deleted database object that includes the stored data associated with the old key prefix; and
maintaining the soft deleted database object for a time period after assigning the new and previously unused key prefix to the existing database object.

15. The computer-implemented method of claim 6, further comprising:
prior to assigning the new and previously unused key prefix, scanning the key prefixes of the stored data; and in response to the scanning, determining a candidate key prefix to be used as the new and previously unused key prefix.

16. The computer-implemented method of claim 7, further comprising:
   prior to assigning the new and previously unused key prefix, scanning the key prefixes of the stored data; and
   in response to the scanning, determining a candidate key prefix to be used as the new and previously unused key prefix.

17. The computer-implemented method of claim 8, further comprising:
   prior to assigning the new and previously unused key prefix, scanning the key prefixes of the stored data; and
   in response to the scanning, determining a candidate key prefix to be used as the new and previously unused key prefix.

18. The computer-implemented method of claim 9, further comprising:
   prior to assigning the new and previously unused key prefix, scanning the key prefixes of the stored data; and
   in response to the scanning, determining a candidate key prefix to be used as the new and previously unused key prefix.

19. The computer-implemented method of claim 8, further comprising repopulating the updated database object with new data.

20. The computer-implemented method of claim 9, further comprising repopulating the updated database object with new data.

* * * * *